United States Patent
Tejima

(10) Patent No.: US 8,268,501 B2
(45) Date of Patent: Sep. 18, 2012

(54) FUEL CELL SYSTEM, CONTROL METHOD THEREFOR, AND MOVABLE BODY

(75) Inventor: Go Tejima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 848 days.

(21) Appl. No.: 12/297,992

(22) PCT Filed: Dec. 11, 2007

(86) PCT No.: PCT/JP2007/074186
§ 371 (c)(1),
(2), (4) Date: Oct. 21, 2008

(87) PCT Pub. No.: WO2008/072755
PCT Pub. Date: Jun. 19, 2008

(65) Prior Publication Data
US 2009/0110970 A1    Apr. 30, 2009

(30) Foreign Application Priority Data

Dec. 12, 2006  (JP) .................................. 2006-335114

(51) Int. Cl.
*H01M 8/04* (2006.01)
(52) U.S. Cl. ........ 429/444; 429/429; 429/430; 429/431; 429/432; 429/450
(58) Field of Classification Search .......... 429/429–432, 429/444, 450
See application file for complete search history.

(56) References Cited

U.S. PATENT DOCUMENTS

| | | | | |
|---|---|---|---|---|
| 6,103,409 | A | * | 8/2000 | DiPierno et al. .............. 429/446 |
| 2004/0038098 | A1 | * | 2/2004 | Imamura et al. ................. 429/25 |
| 2005/0238934 | A1 | | 10/2005 | Takahashi |
| 2006/0222924 | A1 | * | 10/2006 | Matsuoka ....................... 429/34 |

FOREIGN PATENT DOCUMENTS

| | | |
|---|---|---|
| JP | 2002-313388 A | 10/2002 |
| JP | 2003-504807 A | 2/2003 |
| JP | 2005-174645 A | 6/2005 |
| JP | 2007-141744 A | 6/2007 |

\* cited by examiner

*Primary Examiner* — Eugenia Wang
(74) *Attorney, Agent, or Firm* — Kenyon & Kenyon LLP

(57) ABSTRACT

A fuel cell system has produced water amount detection means that detects the amount of water produced in the fuel cell during low-efficiency operation of the system and gas supply limitation means that limits the amount of gas to be supplied to the fuel cell, based on the detected amount of water. The produced water amount detection means allows the amount of produced water to be correctly determined during low-efficiency operation of the fuel cell, thereby enabling the appropriate warm-up, and inhibits a condition, in which the amount of produced water is too large and warm up operation is hindered, to be generated. As a result, the amount of water produced during low-efficiency operation of the fuel cell is correctly determined and the appropriate warm-up is enabled.

6 Claims, 6 Drawing Sheets

FUEL CELL SYSTEM, CONTROL METHOD THEREFOR, AND MOVABLE BODY

This is a 371 national phase application of PCT/JP2007/074186 filed 11 Dec. 2007, which claims priority to Japanese Patent Application No. 2006-335114 filed 12 Dec. 2006, the contents of which are incorporated herein by reference.

BACKGROUND

The present invention relates to improvement of a fuel cell system that performs low-efficiency operation for a warm-up during a startup.

When a fuel cell starts operating in a low-temperature environment at or lower than the freezing point, the water remaining in a cathode electrode, an anode electrode, or a diffusion layer freezes, hindering the gas flow, and the water remaining in the polymer electrolyte membrane freezes, thereby decreasing the proton conductivity. For this reason, in a low-temperature startup, a warm-up operation of fuel cell is performed and then a transition is made to a high-efficiency operation.

In the warm-up operation of the fuel cell, the power generation efficiency is decreased and the amount of self-generated heat is increased to enhance the warm-up. For example, Japanese Patent Application Laid-open No. 2005-174645 (paragraphs 0013, 0037 to 0048) describes a method of performing the warm-up operation of a fuel cell in a state in which the flow rate of the oxidizing agent gas supplied to part of the fuel cell is reduced or terminated. With such a method, a reduction reaction proceeds in the portion where the oxidizing agent gas is absent, hydrogen is generated, and heat is produced, thereby ensuring intensive increase in temperature.

National Publication of the translation of International Application No. 2003-504807 (paragraph 0009) describes a method by which a deficit of reaction product is similarly induced in part of a fuel cell, the degree of overvoltage in this part is increased, and heat is generated.

However, in the conventional fuel cell system that performs low-efficiency operation, the fuel cell temperature is monitored and the low-efficiency operation is stopped when the temperature rises (for example, Japanese Patent Application Laid-open No. 2005-174645, paragraph 0040), but when the amount of oxidizing agent gas supplied during the low-efficiency operation is too large, the exothermal reaction does not occur, an excess amount of water is produced, and there is a risk of inhibiting the warm-up operation.

SUMMARY

Accordingly, it is an object of the present invention to determine correctly the amount of water produced in the low-efficiency operation of the fuel cell and enable the appropriate warm-up.

In order to attain this object, the present invention provides a fuel cell system in which an amount of gas to be supplied to a fuel cell is limited to perform a low-efficiency operation, an amount of water produced in the fuel cell being detected during the low-efficiency operation, and the amount of gas to be supplied to the fuel cell being limited, based on the detected amount of water.

For example, the fuel cell system comprises produced water amount detection means for detecting the amount of water produced in the fuel cell during the low-efficiency operation and gas supply limitation means for limiting the amount of gas to be supplied to the fuel cell, based on the detected amount of water.

With such a configuration, the amount of water produced during low-efficiency operation is determined and the amount of gas supplied to the fuel cell is limited based on the determined amount of water. Therefore, the probability of the amount of gas supplied being too large, an excess amount of water being produced, and the warm-up operation being hindered can be reduced.

Here, for example, the produced water amount detection means comprises: output current detection means for detecting an output current of the fuel cell; output current integration means for integrating the detected output current for each detection timing; and produced water amount computation means for estimating the amount of produced water based on the integrated output current.

With such a configuration, the output current is detected and the total amount of water generated after the startup by the electrochemical reaction can be determined based on the integrated value of the output current.

Here, for example, the gas supply limitation means comprises: output voltage detection means for detecting an output voltage of the fuel cell; temperature detection means for detecting a temperature of the fuel cell; next-cycle current estimation means for estimating an output current after a predetermined interval, based on the estimated amount of produced water, the detected output voltage, and the detected temperature; gas flow rate estimation means for estimating a flow rate at which a gas has to be supplied to the fuel cell, based on the estimated output current after a predetermined interval; and gas supply control means for supplying the gas at the estimated flow rate to the fuel cell.

With such a configuration, the amount of current at the next control timing can be correctly predicted based on the voltage value detected at the predetermined control timing, temperature, and the amount of produced water that is detected with the produced water detection means, the gas supply amount that is suitable for generating such amount of current can be determined, and the gas can be supplied to the fuel cell in such supply amount. Therefore, appropriate warm-up operation can be performed without producing excess water.

In accordance with the present invention, it is preferred that the amount of water be detected, based on a state of a portion with relatively adverse conditions within the fuel cell.

With such a configuration, because a portion in which conditions can easily become relatively adverse is a portion where the appropriate warm-up operation is inhibited, detecting the amount of water in this portion enables a more appropriate warm-up operation.

In accordance with the present invention, for example, the gas supply limitation means limits the supply of cathode gas. This is because, low-efficiency operation can be performed by employing an appropriate oxidizing agent gas.

Further, the control method for a fuel cell system in accordance with the present invention is a control method for a fuel cell system in which an amount of gas to be supplied to a fuel cell is limited to perform a low-efficiency operation, the method comprising: a step of detecting an amount of water produced in the fuel cell during the low-efficiency operation; and a step of limiting the amount of gas to be supplied to the fuel cell, based on the detected amount of water.

Thus, the step of detecting the amount of water comprises: a step of detecting an output current of the fuel cell; a step of integrating the detected output current for each detection timing; and as step of estimating the amount of produced water, based on the integrated output current.

Further, the step of limiting the amount of supplied gas comprises: a step of detecting an output voltage of the fuel cell; a step of detecting a temperature of the fuel cell; a step of estimating an output current after a predetermined interval, based on the estimated amount of produced water, the detected output voltage, and the detected temperature; a step of estimating a flow rate at which a gas has to be supplied to the fuel cell, based on the estimated output current after a predetermined interval; and supplying the gas at the estimated flow rate to the fuel cell.

The fuel cell system in accordance with the present invention is preferably mounted on a movable body. This is because the present invention can be applied to low-efficiency operation during startup when warm-up operation is performed in a movable body.

DETAILED DESCRIPTION

The preferred embodiments of the present invention will be described below.

Figure 1:
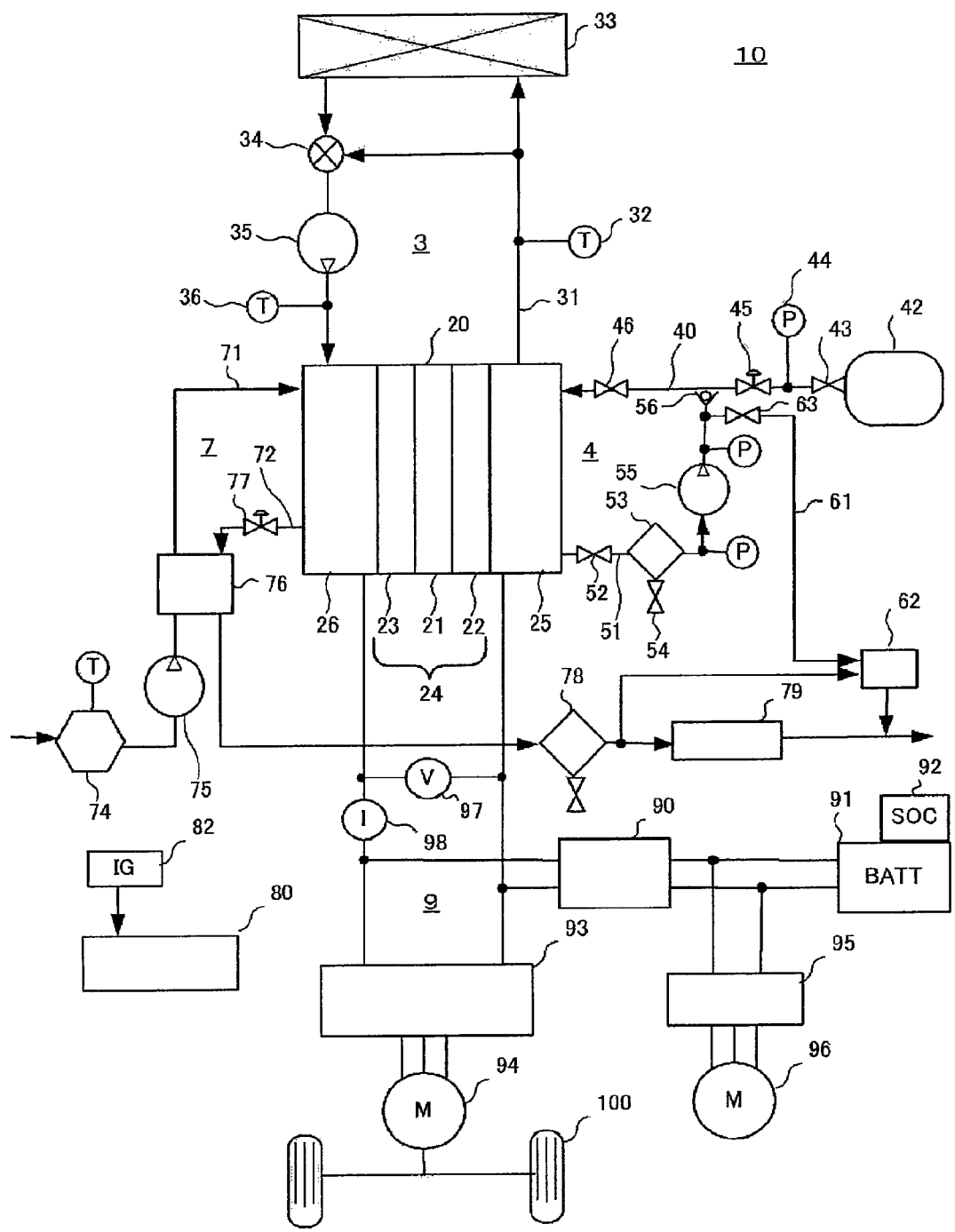
FIG. 1 is a system configuration drawing of a fuel cell system of the present embodiment.

FIG. 1 is a system configuration drawing of a fuel cell system of the present embodiment.

In FIG. 1, a fuel cell system 10 is configured by a fuel gas supply system 4 for supplying a fuel gas (hydrogen gas) to a fuel cell 20, an oxidizing gas supply system 7 for supplying an oxidizing gas (air) to the fuel cell 20, a cooling system 3 for cooling the fuel cell 20, and a power system 9 that is charged with the power generated by the fuel cell 20 and can discharge the power.

The fuel cell 20 comprises a membrane-electrode joint body 24 in which an anode electrode 22 and a cathode electrode 23 are formed, for example, by screen printing on both sides of a polymer electrolyte membrane 21 composed, for example, from a proton-conducting ion-exchange resin formed from a fluororesin or the like. Both surfaces of the membrane-electrode joint body 24 are sandwiched by separators (not shown in the figure) having flow channels for the fuel gas, oxidizing gas, and cooling water, and respective groove-shaped anode channel 25 and cathode channel 26 are formed between the separators and the anode electrode 22 and cathode electrode 23. The anode electrode 22 is configured by providing a catalyst layer for a fuel electrode on a porous support layer, and the cathode electrode 23 is configured by providing a catalyst layer for an air electrode on a porous support layer. These catalyst layers of electrodes are configured, for example, by attaching platinum particles.

An oxidation reaction represented by the following Equation (1) proceeds at the anode electrode 22, and a reduction reaction represented by the following Equation (2) proceeds at the cathode electrode 23. An electromotive reaction represented by the following Equation (3) proceeds in the entire fuel cell 20.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

For the sake of convenience of explanation, the structure of a unit cell composed by a membrane-electrode joint body 24, anode gas channel 25, and cathode gas channel 26 is shown schematically in FIG. 1. Actually, a stack structure is provided in which a plurality of such unit cells are connected in series via the above-described separators.

The cooling liquid supply system 3 of the fuel cell system 10 comprises a cooling channel 31 for circulating the cooling liquid, a temperature sensor 32 that detects the temperature of cooling liquid drained from the fuel cell 20, a radiator (heat exchanger) 33 that dissipates the heat of cooling liquid to the outside, a valve 34 that adjusts the amount of cooling liquid flowing into the radiator 33, a cooling liquid pump 35 that causes circulation of cooling liquid under pressure, and a temperature sensor 36 that detects the temperature of cooling liquid supplying to the fuel cell 20.

The fuel gas supply system 4 of the fuel cell system 10 comprises a fuel gas flow channel 40 for supplying a fuel gas (anode gas), for example hydrogen gas, from the fuel gas supply device 42 to the gas channel 25, and a circulation flow channel (circulation path) 51 for causing circulation of the fuel off-gas discharged from the anode gas channel 25 in the fuel gas flow channel 40, and these gas flow channels constitute a fuel gas circulation system.

The fuel gas flow channel 40 comprises a shut-off valve (primary valve) 43 that controls the fuel gas outflow from the fuel gas supply device 42, a pressure sensor 44 that detects the fuel gas pressure, a regulation valve 45 that regulates the fuel gas pressure in the circulation path 51, and a shut-off valve 46 that controls the fuel gas supply to the fuel cell 20. For example, the fuel gas supply device 42 is configured by a high-pressure hydrogen tank, a hydrogen storage alloy, and a reformer.

The circulation flow channel 51 comprises a shut-off valve 52 that controls the fuel off-gas supply from the fuel cell 20 to the circulation flow channel 51, a gas-liquid separator 53 and a discharge valve 54 that removes moisture contained in the fuel off-gas, a hydrogen pump (circulation pump) 55 that compresses the fuel off-gas in which pressure loss has occurred, rises the gas pressure to an appropriate level, and returns the gas to the fuel gas flow channel 40 when the gas passes through the anode gas channel 25, and counterflow preventing valve 56 that prevents the counterflow of the fuel gas of the fuel gas flow channel 40 to the circulation flow channel 51. Where the hydrogen pump 55 is driven by a motor, the fuel off-gas affected by the drive of hydrogen pump 55 merges with the fuel gas supplied from the fuel gas supply device 42 in the fuel gas flow channel 40 and is then supplied to the fuel cell 20 and reused. A revolution speed sensor 57 (not shown in the figure) that detects the revolution speed of the hydrogen pump 55 is installed in the hydrogen pump 55.

The circulation flow channel 51 is provided with a branched discharge gas flow channel 61 for discharging the fuel off-gas released from the fuel cell 20 to the outside of the vehicle via a diluting unit (for example, hydrogen concentration reducing unit) 64. A purge valve 63 is disposed in the discharge gas flow channel 61 so as to control the discharge of the fuel off-gas. By opening and closing the purge valve 63, it is possible to repeat circulation inside the fuel cell 20, discharge the fuel off-gas having increased concentration of impurities to the outside, introduce new fuel gas, and prevent the decrease in cell voltage. Further, it is also possible to cause pulsations of the inner pressure in the circulation channel 51 and remove water accumulated in the gas flow channel.

On the other hand, the oxidizing gas supply system 7 of the fuel cell system 10 has provided therein an oxidizing gas flow channel 71 for supplying an oxidizing gas (cathode gas) to the cathode gas channel 26 and a cathode off-gas flow channel 72 for discharging the cathode off-gas released from the cathode gas channel 26. The oxidizing gas flow channel 71 has installed therein an air cleaner 74 that takes air from the atmosphere and an air compressor 75 that compresses that air that has been taken in and pumps the compressed air as oxidizing agent gas to the cathode gas channel 26. The air compressor 75 comprises a revolution speed sensor 73 (not shown in the figure) that detects the revolution speed of the air compressor 75. A humidifier 76 that performs humidity exchange is provided between the oxidizing gas flow channel 71 and cathode off-gas flow channel 72. The cathode off-gas flow channel 72 is provided with a pressure regulating valve 77 that regulates the discharge gas pressure in the cathode off-gas flow channel 72, a gas-liquid separator 78 that removes moisture contained in the cathode off-gas, and a muffler 79 that absorbs the discharged gas noise of the cathode off-gas. The cathode off-gas released from the gas-liquid separator 78 is branched. Part thereof flows into the diluting unit 62 and is mixed with and diluted by the fuel off-gas remaining in the diluting unit 62. The other part of the cathode off-gas is passed through the muffler 79 to absorb noise, mixed with the gas obtained by mixing and diluting with the diluting unit 62, and released to the outside of the vehicle.

Further, the power system 9 of the fuel cell system 10 has connected thereto a DC-DC converter 90 that is connected on the primary side thereof to the output terminals of a battery 91 and on the secondary side thereof to the output terminals of the fuel cell 20, the battery 91 that stores extra power and regenerates power as a secondary battery, a battery computer 92 that monitors the charging state of the battery 91, an inverter 93 that supplies AC power to a load of the fuel cell 20 or a motor 94 for moving the vehicle that is the drive object, an inverter 95 that supplies AC power to various high-voltage auxiliary devices 96 of the fuel cell system 10, a voltage sensor 97 that measures the output voltage of the fuel cell 20, and a current sensor 98 that measures the output current.

The DC-DC converter 90 performs voltage conversion of the extra power of the fuel cell 20 or the regenerated power generated by a braking operation of the motor 94 for moving the vehicle and supplies the converted voltage to charge the battery 91. Further, the DC-DC converter 90 performs voltage conversion of the discharge power from the battery 91 and outputs the converted power to the secondary side in order to replenish the power generated by the fuel cell 20 according to the required power of the motor 94 for moving the vehicle.

The inverters 93 and 95 convert the DC current into a three-phase AC current and output the current to the motor 94 for moving the vehicle and to the high-voltage auxiliary devices 96, respectively. A revolution speed sensor 99 (not shown in the figure) that detects the revolution speed of the motor 94 is installed in the motor 94 for moving the vehicle. The motor 94 is mechanically coupled to wheels 100 via a differential, and the rotation force of the motor 94 can be converted into the propulsion force of the vehicle.

The voltage sensor 97 and current sensor 98 serve to measure the AC impedance based on the phase and amplitude of electric current corresponding to the voltage in the superimposed AC signal in the power system. The AC impedance corresponds to the water content in the fuel cell 20.

Further, a control unit 80 for controlling power generation by the fuel cell 12 is installed in the fuel cell system 10.

The control unit 80 is configured by a general-purpose computer comprising, for example, a CPU (central processing unit), a RAM, a ROM, and interface circuit and serves to receive sensor signals from the temperature sensors 32, 36, pressure sensor 44, and revolution speed sensors 57, 73, 99 and signals from the voltage sensor 97, the current sensor 98 and an ignition switch 82, drive the motor correspondingly to the battery operation state, for example, a power load, regulate the revolution speed of the hydrogen pump 55 and air compressor 75, perform opening/closing control of various valves, and regulate the valve opening degree.

Further, the control unit 80 selects the hydrogen pump 55 and/or air compressor 75 as scavenging gas supply means (auxiliary device) for supplying a scavenging gas, for example, hydrogen gas and oxygen gas, to the fuel cell 20 when the operation of the fuel cell 20 is stopped and scavenging treatment is performed, and controls the revolution speed of the hydrogen pump 55 and/or air compressor 75 or a product of the revolution speed and operation time.

Here, the control unit 80 functions to perform a low-efficiency operation during start-up and to perform warm-up operation of the fuel cell 20. More specifically, the amount of oxidizing gas supplied from the oxidizing gas supply system 7 is limited, a state with insufficient supply of the oxidizing agent to the unit cells of the fuel cell 20 is assumed, and the amount of generated electric current and amount of produced water are inhibited, thereby generating heat and accelerating the warm-up.

In particular, in the present embodiment, the control unit 80 detects the amount of water produced in the fuel cell 20 and controls the supply of oxidizing gas by determining the amount of the oxidizing gas that has to be supplied based on the detected amount of water.

(Explanation of Operation Principle)

The following operation performed in accordance with the present invention will be described below.

First, a method for detecting the amount of produced water in the fuel cell and determining the amount of oxidizing gas for scavenging in the present embodiment will be explained.

In the fuel cell system 10, when the fuel cell is started, the amount of supplied oxidizing gas is inhibited and warm-up operation that generates a large amount of heat is performed. In this case, where the amount of supplied oxidizing gas during low-efficiency operation is too large, an exothermal reaction does not proceed and there is a risk of producing excess amount of water and hindering the warm-up operation. Accordingly, in the present embodiment, the amount of produced water is correctly detected and the correct amount of oxidizing gas is supplied, as described hereinbelow.

Figure 3:
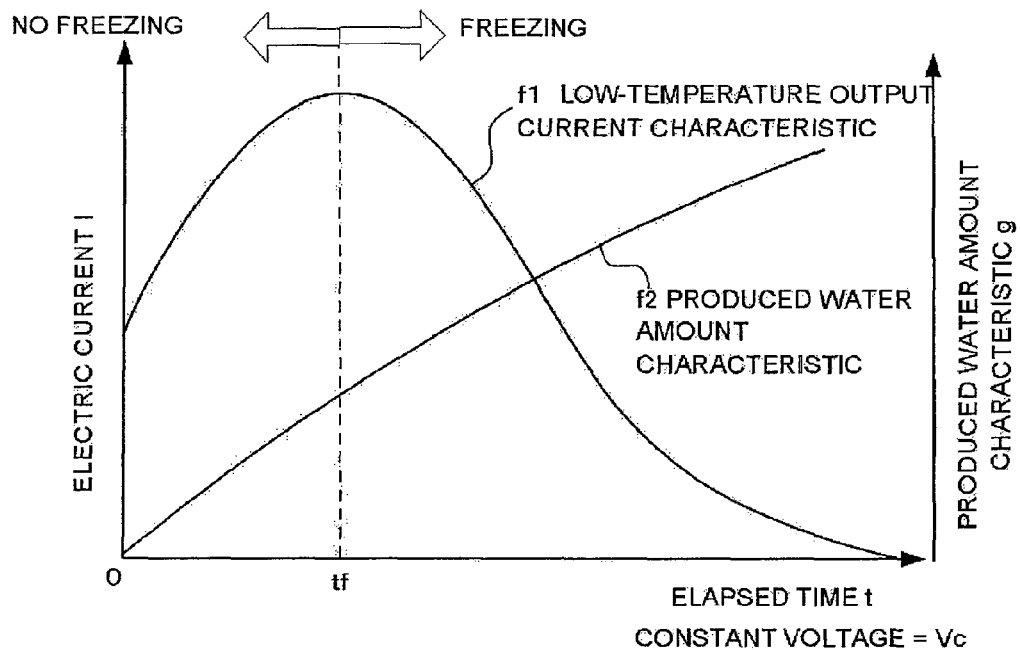
FIG. 3 shows the relationships (constant voltage) of the output current I and amount g of generated water vs. the time that has elapsed during startup.

FIG. 3 shows the relationships of the output current I and amount g of generated water vs. the time that has elapsed during startup in the environment at or lower than the freezing point. This figure shows the characteristics obtained under an assumption that the output voltage of the fuel cell 20 is Vc (constant) and the temperature of the fuel cell 20 is also constant.

As shown by a low-temperature output current characteristic f1 in FIG. 3, when the fuel cell is started, the reaction represented by Equation (2) above proceeds at the cathode electrode 23 and water is generated. However, where the temperature immediately after the startup becomes equal to or lower than the freezing point, the produced water starts freezing after a short interval (time tf). Where the produced water freezes, gas flow is hindered and proton conductivity of the polymer electrolyte membrane 21 decreases. Therefore, after the freezing initiation time if as a boundary, greater part of water freezes even though the total amount of the produced water increases, and the output voltage characteristic f1 decreases.

In this case, as shown by the produced water amount characteristic f2, the amount of produced water g increases with time. Because water is generated according to Equation (2) above, one molecule (molecular weight 18) of water is generated for two electrons. Therefore, the amount of produced water g can be calculated by Equation (4) where $\int I$ is the total amount of current (electric charge quantity) after power generation has been started, F is a Faraday constant, $M(H_2O)$ is the molecular weight of water.

$$\text{Amount of produced water } g = (\int I \times M(H_2O))/2F \qquad (4)$$

Therefore, by monitoring the amount of current I per unit time that changes as shown by the low-temperature output current characteristic f1 in FIG. 3, calculating the integral value $\int I$, and substituting the result in Equation (4), it is possible to detect the amount of produced water g such as represented by the produced water amount characteristic f2.

In the present embodiment, the amount of current I can be calculated from the detection signal of the current sensor 98 of the fuel cell 20. Accordingly, the control unit 80 operates to calculate the amount of current I per unit time, calculate and update the integral value $\int I$, and also detect the amount of produced water g per unit time according to Equation (4) at the same time.

Figure 4:
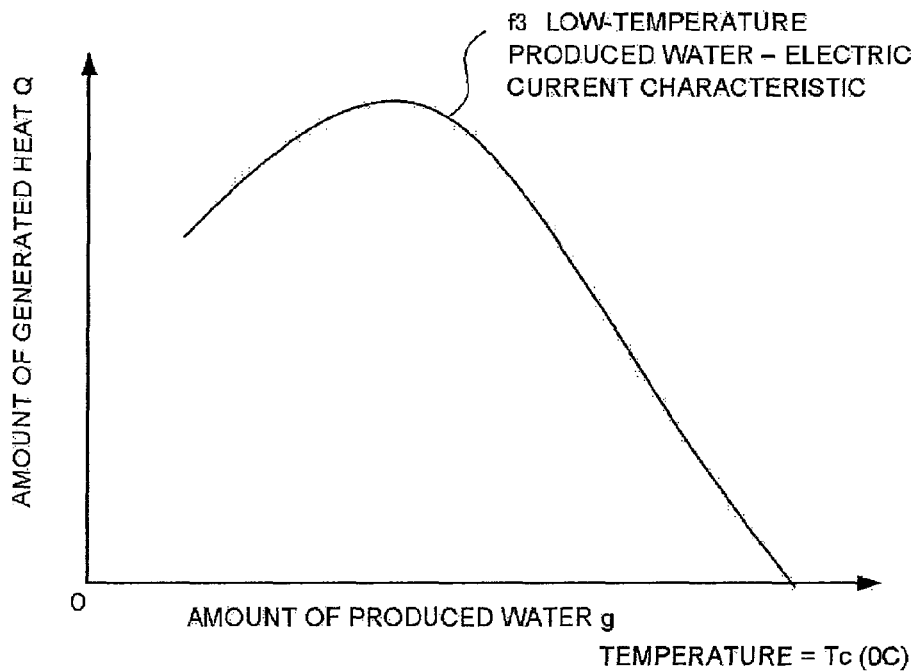
FIG. 4 shows the relationship between the amount g of generated water and the output current I.

FIG. 4 shows the relationship between the amount of produced water g and the output current I at the time of low-temperature startup. This figure is a characteristic relating to the case in which the temperature of the fuel cell 20 is a constant value Tc.

As shown by the low-temperature produced water—current characteristic f3 in FIG. 4, at the initial stage of low-temperature startup, the amount of produced water increases following the increase in the amount of current I, but after a certain interval, the produced water freezes and hiders the gas flow, thereby decreasing the amount of current I. At a stage at which the electrochemical reaction practically does not proceed, the electric current becomes zero.

Here, the amount of current can be estimated based on the output voltage V of the fuel cell, the temperature T of the fuel cell, and the amount of produced water g. Thus, the amount of current $I_{t+1}$ at a certain point in time t+1 in the future can be derived based on Equation (5) in which Vt is the output voltage of the fuel cell at a certain time t, Tt is the fuel cell temperature, and gt is the amount of produced water at this time.

$$I_{t+1} = I(Vt, Tt, gt) \qquad (5)$$

In the present embodiment, the output voltage V of the fuel cell 20 can be detected from the detection signal of the voltage sensor 97, and the temperature T of the fuel cell 20 can be detected from the detection signal of the temperature sensor 32. Further, the amount of produced water g can be detected based on Equation (4). Accordingly, the control unit 80 operates to calculate the output voltage V and temperature T of the fuel cell 20 per unit time, substitute into Equation (5) the output voltage V, temperature T, and amount of produced water g that is determined from Equation (4), and predict the future amount of current $I_{t+1}$ after the next unit time.

The amount of current I in the case the output voltage V, temperature T, and amount of produced water g are taken as parameters can be determined by measurements or the like. The control unit 80 stores the correlation between these four parameters as a memory table.

Figure 5:
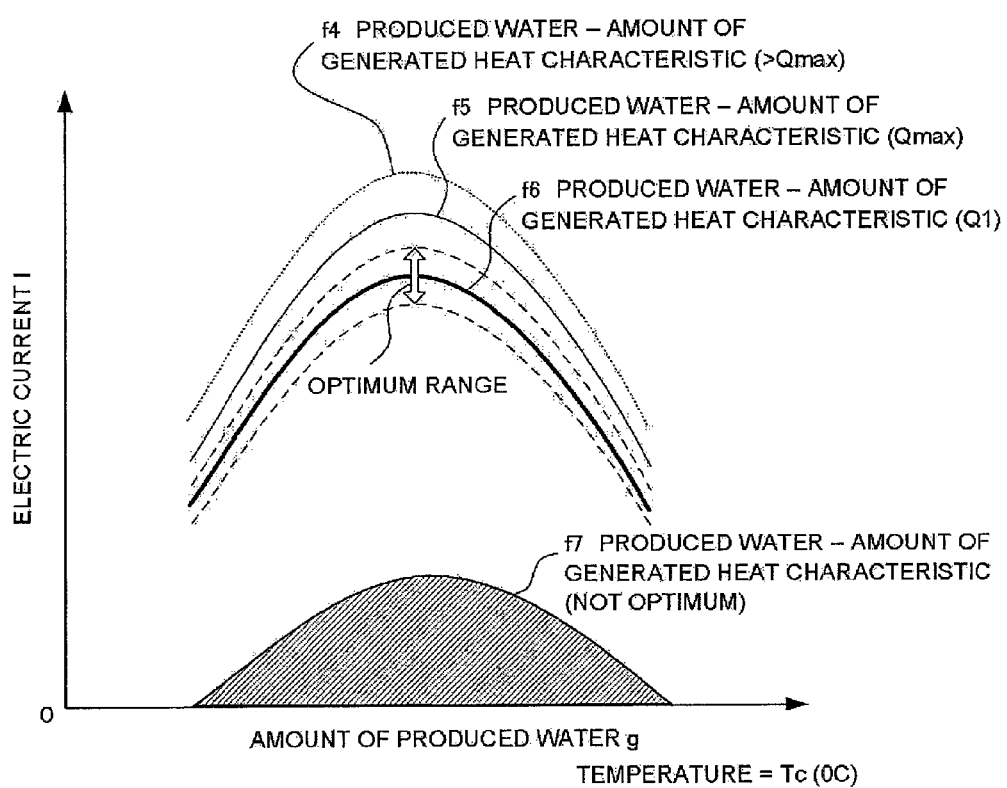
FIG. 5 is an explanatory drawing illustrating the control appropriate curve in the relationship between the amount of generated water and output current.

FIG. 5 shows how the produced water—amount of generated heat characteristic changes correspondingly to the total amount of generated heat in the relationship between the amount of produced water g and amount of generated heat Q. This figure shows the characteristic relating to the case in which the temperature of the fuel cell 20 is equal to or lower than the freezing point.

The amount of generated heat Q in the fuel cell corresponds to the amount of current I. Therefore, the produced water—amount of generated heat characteristic curve shown in FIG. 5 approximates the amount of produced water—amount of current characteristic curve shown in FIG. 4. The amount of generated heat tends to increase with the decrease in the flow rate of the supplied gas. The produced water—amount of generated heat characteristic represented by curve f5 shows the maximum amount of heat Qmax (for example, air stoichiometric ratio=1) that can be generated without failure when the fuel cell is at a temperature T. Where the amount of heat is equal to or exceeds the maximum amount of heat Qmax, the fuel cell is adversely affected. On the other hand, where the amount of generated heat is less than Qmax, the operation state is assumed in which the object of warm-up operation cannot be attained.

For example, the curve f7 in FIG. 5 is an operation characteristic in which the gas flow rate is too high and the amount of generated heat is sufficiently less than the maximum amount of generated heat Qmax, thereby creating conditions unsuitable for warm-up operation. On the other hand, in curve f4, the amount of gas is too small, the amount of generated heat exceeds the allowed amount of generated heat Qmax, and there is a risk of the high temperature causing deterioration of electrolyte membrane and other parts of the fuel cell. These conditions are also unsuitable for warm-up operation.

By contrast, the fixed range (range shown by the arrows sandwiched between two broken lines) which is centered on the curve f6 and drawn at a certain distance from the curve f5 at which the maximum amount of generated heat Qmax is produced is controlled to the proximity of the maximum amount of generated heat Qmax. Therefore, this range can be considered as the range of optimum amount of generated heat in which the adverse effect on the fuel cell caused by excess amount of generated heat and the insufficient warm-up caused by a low amount of generated heat are prevented. In the present embodiment, the control unit 80 controls the entire system, more specifically the amount of supplied oxidizing gas (air) so that the produced water—amount of generated heat characteristic is maintained within the optimization range centered on the curve f6.

Thus, in order to perform the appropriate warm-up operation, the amount of current I related to the amount of produced water g has to be controlled to fall within the optimization range. For this purpose, the control is required such that the gas, more specifically the oxidizing gas supplied to the cathode electrode of the fuel cell, be supplied at a flow rate within an appropriate range. Accordingly, in the present embodiment, the control unit 80 adjusts the flow rate q of the oxidizing gas supplied to the cathode electrode 23 of the fuel cell 20 so that the future amount of current calculated by Equation (5) be maintained within an appropriate range with respect to the amount of produced water g. More specifically, the flow rate of the oxidizing gas is adjusted by the revolution speed of the compressor that is indicated by the control signal for driving the compressor 75.

The amount of current I within the range that is optimum for performing appropriate warm-up operation with respect to the amount of produced water g is stored as a memory table by the control unit 80. Further, the relationship between the flow rate of the supplied oxidizing gas and the amount of current I generated by the fuel cell 20 is also stored as a memory table by the control unit 80.

(Explanation of Functional Blocks)

The operation based on the above-described principle is implemented with the following functional blocks.

Figure 2:
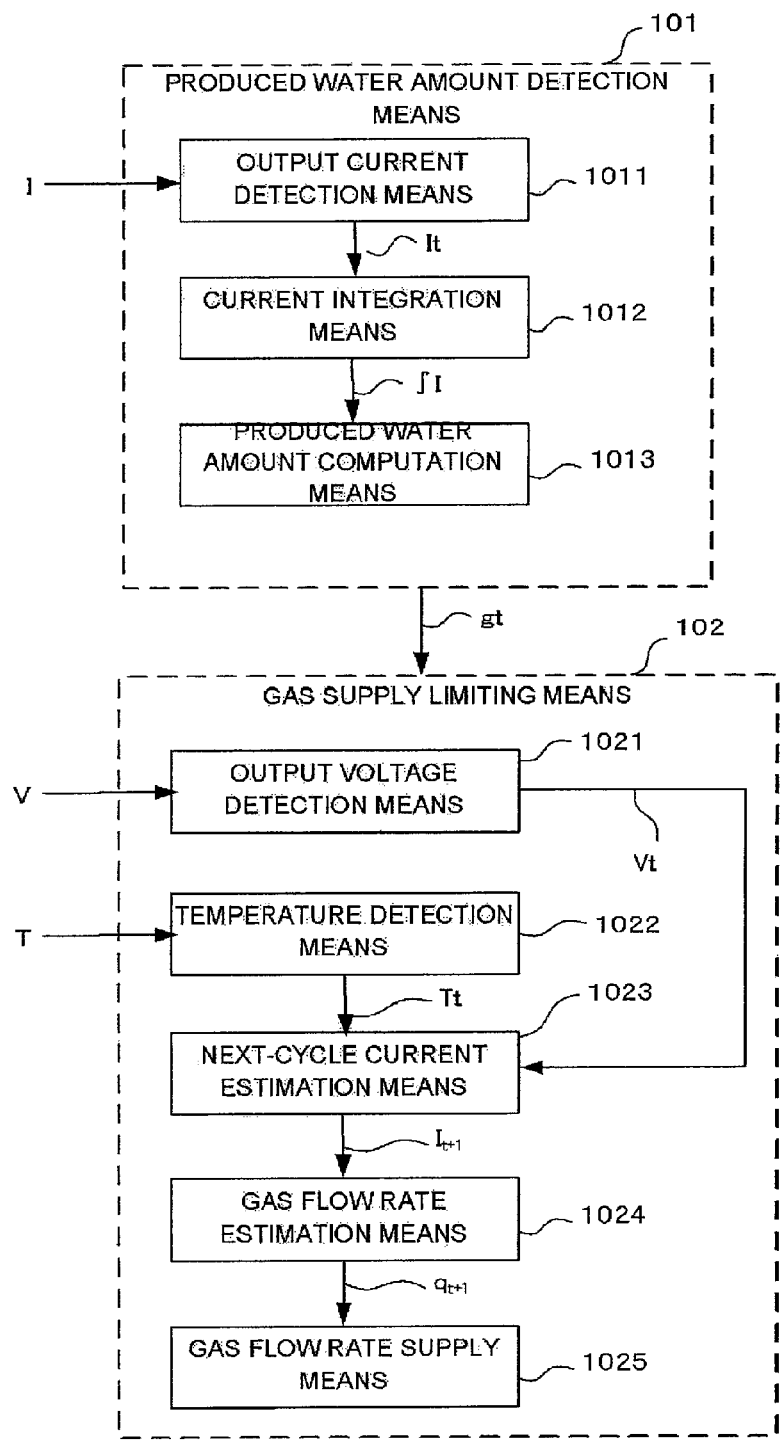
FIG. 2 is a functional block diagram for low-efficiency operation during start-up in the present embodiment.

FIG. 2 is a functional block diagram of low-efficiency operation during startup implemented mainly with the control unit 80. As shown in FIG. 2, when low-efficiency operation is performed during startup, the fuel cell system 10 includes produced water amount detection means 101 and gas supply limitation means 102.

The produced water amount detection means 101 detects the amount of water g produced in the fuel cell 20 during low-efficiency operation. The gas supply limitation means 102 limits the amount of oxidizing gas q supplied to the fuel cell 20 based on the detected amount of produced water g. The gas supply control is performed at each predetermined control timing. For example, the gas supply control performed at a time t determines the oxidizing gas supply amount q at a time t+1 that is the next control timing based on the status values of the system at the time t.

More specifically, the produced water amount detection means 101 comprises output current detection means 1011, output current integration means 1012, and produced water amount calculation means 1013.

The output current detection means 1011 detects the output current It of the fuel cell 20 at the time t. This means is equivalent to the current sensor 98 and the control unit 80 that determines the amount of current based on the detection signals for the current sensor 98. The output current calculation means 1012 integrates the detected output current It for each detection timing from the start of low-efficiency operation and outputs the integrated value $\int I$. This means corresponds to the internal memory of the control unit 80 and the control unit 80. The produced water amount calculation means 1013 estimates the amount of produced water gt at the time t based on the integrated output current $\int I$. This means is equivalent to the control unit 80.

Further, the gas supply limitation means 102 comprises output voltage detection means 1021, temperature detection means 1022, next-cycle current estimation means 1023, gas flow rate estimation means 1024, and gas supply control means 1025.

The output voltage detection means 1021 detects the output voltage Vt of the fuel cell 20 at the time t. This means is equivalent to the voltage sensor 97 and the control unit 80 that determines the voltage value based on the detection signal of the voltage sensor 97. The temperature detection means 1022 detects the temperature Tt of the fuel cell 20 at the time t. This means is equivalent to the temperature sensor 32 and the control unit 80 that determines the temperature based on the detection signal of the temperature sensor 32. The next-cycle current estimation means 1023 estimates the output current $I_{t+1}$ at the predetermined time t+1 based on the estimated amount of produced water gt, detected output voltage Vt, and detected temperature Tt. This means is equivalent to the control unit 80. The gas flow rate estimation means 1024 estimates the flow rate Qt+1 at which the gas has to be supplied to the fuel cell 20 based on the estimated output current $I_{t+1}$ at the predetermined time t+1. This means is equivalent to the control unit 80. The gas supply control means 1025 supplies the gas at the estimated flow rate Qt+1 to the fuel cell 20. This means is equivalent to the control unit 80 and the compressor 75 that supplies the oxidizing gas by operating at the revolution speed based on the control performed by the control unit 80.

(Explanation of Operation Procedure)

Figure 6:
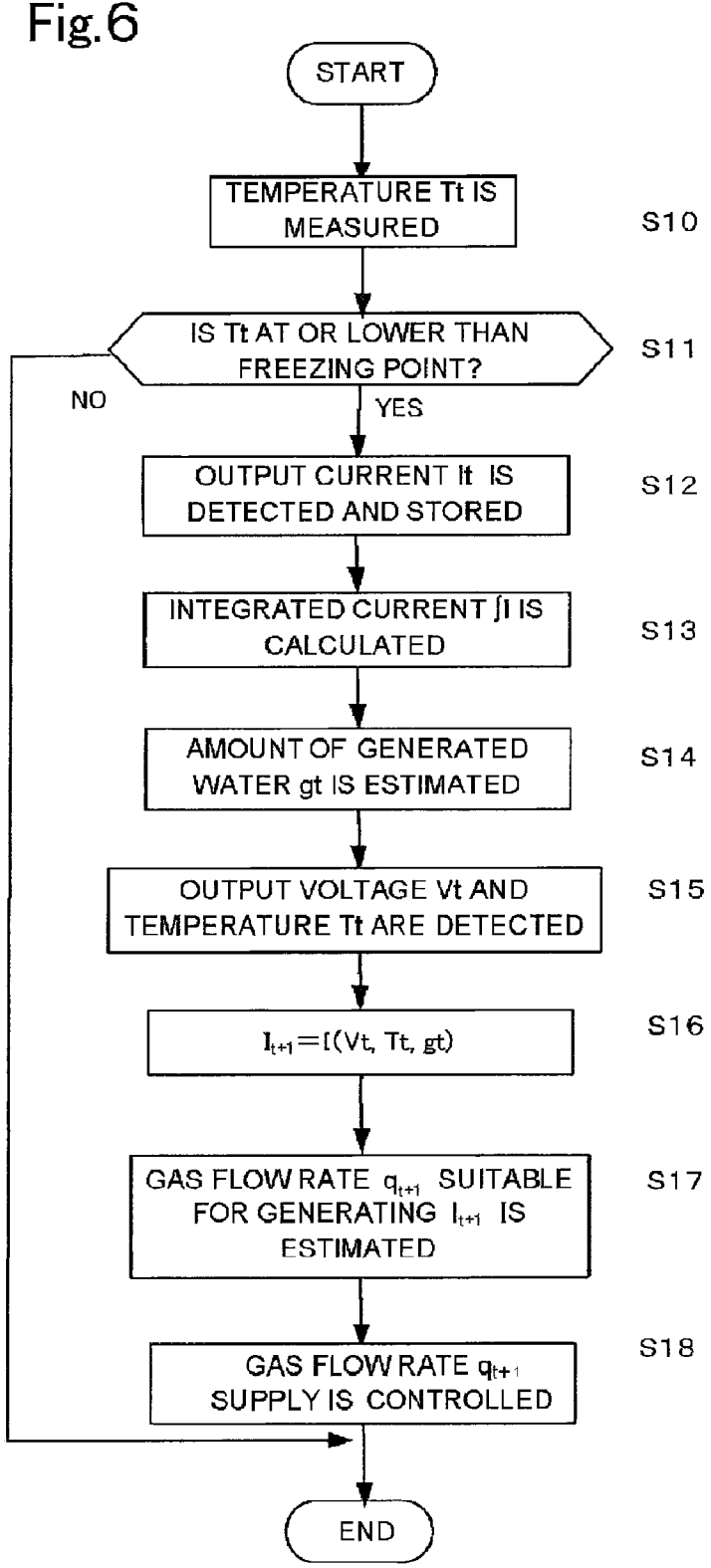
FIG. 6 is a processing flowchart of low-efficiency operation in the present embodiment.

The low-efficiency operation of the present embodiment will be described below based on the flowchart shown in FIG. 6. The operations shown in this flow chart are assumed to be executed for each predetermined control timing. In this processing, the state of each part of the system is calculated at the control timing at the time t, thereby estimating the oxidizing gas supply at the time t+1, which is the next control timing.

In step S10, the control unit 80 calculates the internal temperature Tt of the fuel cell 20 by referring to the detection signal of the temperature sensor 32 at the time t. The temperature indicated by the temperature sensor 32 is the temperature of the cooling liquid flowing inside the fuel cell 20 and represents the average temperature of the fuel cell 20.

In step S11, the control unit 80 investigates whether the detected temperature Tt of the fuel cell 20 is equal to or less than a freezing point. When the investigation results demonstrate that the temperature Tt of the fuel cell 20 is higher than the freezing point (NO), it is determined that no warm-up operation is required for the fuel cell 20, and the warm-up operation processing is completed. On the other hand, when the temperature Tt of the fuel cell 20 is equal to or less than the freezing point (YES), the control unit 80 determines that a warm-up operation, that is, low-efficiency operation is required for the fuel cell 20, and the processing flow advances to step S12.

In step S12, the output current detection means 1011 of the produced water amount detection means 101 that is operated by the control unit 80 detects and stores the output current amount It of the fuel cell 20 at the timing t by referring to the detection signal of the current sensor 98. The processing flow then advances to step S13, and the current integration means 1012 further integrates the current amount It that has been measured this time to the total current amount integrated for the preceding control timing and calculates the total current amount $\int i$ from the warm-up start to the time t, that is, the amount of electric charge. The calculated total current amount is stored for integration of the next cycle.

Advancing to step S14, the produced water amount computation means 1013 substitutes the updated total current amount $\int I$ into Equation (4) above and computes the amount of produced water gt at the time t. The detected amount of produced water gt is sent to the gas supply limitation means 102 for estimating the oxidizing gas supply amount $q_{t+1}$.

Advancing to step S15, the output voltage detection means 1021 of the gas supply limitation means 102 detects the output voltage amount Vt of the fuel cell 20 at the time t by referring to the detection signal of the voltage sensor 97. Further, the temperature detection mans 1022 detects the temperature Tt at the time t of the fuel cell 20 by referring to the detection signal of the temperature sensor 32.

Here, the temperature of the fuel cell 20 is detected based on the detection signal of the temperature sensor 32, but because the temperature Tt of the fuel cell 20 has already been detected in step S10, this value may be also used. However, when a configuration is employed such that the temperature of a specific unit cell is detected for current evaluation, the temperature of the specific unit cell is detected as Tt in step S15.

In step S16, the next-cycle current estimation means 1023 estimates the current amount $I_{t+1}$ at the time t+1, which is the control timing of the next cycle, by using Equation (5) above based on the output voltage Vt at the time t, temperature Tt, and the amount of produced water gt supplied from the produced water amount detection means 101. Thus, the next-cycle current estimation means 1023 uses the aforementioned three parameters as reference values, refers to the internal memory table, and specifies one current value specified by these parameters as the current amount $I_{t+1}$ of the next cycle.

Then, in step S17, the gas flow rate estimation means 1024 performs calculations for estimating the oxidizing gas flow rate $q_{t+1}$ that is appropriate for causing the fuel cell 20 to generate power at the estimated output current amount $I_{t+1}$. In other words, the oxidizing gas flow rate $q_{t+1}$ necessary for generating the current value $I_{t+1}$ at the control timing of the next cycle is determined with reference to the internal memory table.

Advancing to step S18, the gas flow rate control means 1025 calculates the revolution speed of the compressor 75 for supplying the oxidizing gas at the flow rate $q_{t+1}$ and supplies the control signal that causes the compressor to operate at such revolution speed to the compressor 75. This revolution speed is taken as a revolution speed at which the oxidizing gas will be supplied at a flow rate $q_{t+1}$ prior to the time t+1.

With the above-described operations, the appropriate oxidizing gas flow rate $q_{t+1}$ at the time t+1, which is the control timing of the next cycle, is estimated at the time t and the compressor 75 is actually driven. Therefore, at the time t+1, a state is assumed in which the oxidizing gas is supplied at the appropriate flow rate $q_{t+1}$. As a result, the output current I of the fuel cell 20 is maintained in the optimum range by the feedback control.

With the above-described embodiment, the amount of produced water gt during low-efficiency operation is determined at the time t and the gas supply amount $q_{t+1}$ to the fuel cell 20 in the control timing of the next cycle (timing t+1) is limited based on the determined amount of produced water. Therefore, the excess supply of gas, excess generation of water, and warm-up failure can be inhibited.

Further, with the present embodiment, the amount of current $I_{t+1}$ at the control timing of the next cycle (time t+1) can be accurately predicted based on the voltage value Vt and temperature Tt detected at the control time t and also based on the amount of generated water gt, and then the gas supply amount $q_{t+1}$ appropriate for generating such current amount is determined and the oxidizing gas is supplied to the fuel cell 20 in this supply amount. Therefore, appropriate warm-up is performed without generating excess water.

MODIFICATION EXAMPLE

The present invention is not limited to the above-described embodiments and can be changed in a variety of ways.

In the above-described embodiment, the fuel cell outlet temperature of cooling liquid is detected by the temperature sensor 32 as the temperature of the fuel cell 20, but such a configuration is not limiting. For example, where the temperature for detecting the amount of produced water is taken as the cooling liquid temperature, as in the above-described embodiment, the amount of produced water is detected based on the average temperature of the fuel cell, but the temperature of a specific portion of the fuel cell may be also detected. In a fuel cell in which a large number of unit cells are stacked, the relative easiness with which the heat is dissipated or the amount of produced water increases varies depending on the position of unit cell. Therefore, the control adapted to relatively adverse conditions can be conducted when a unit cell that tends to be relatively unsuitable for estimating the gas flow rate, for example, a unit cell that easily dissipates heat and assumes a low temperature, or a unit cell with a low efficiency of discharging the amount of produced water is specified, and the temperature of amount of water in such a unit cell is detected and the oxidizing gas flow rate control is performed.

Figure 7:
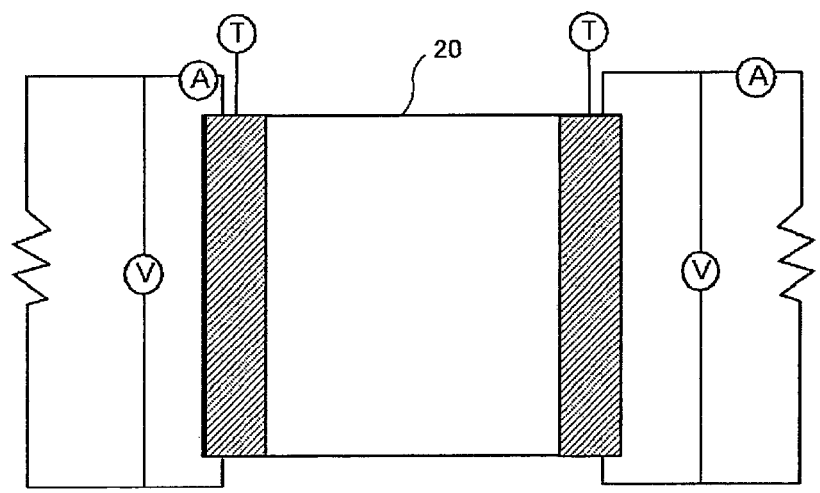
FIG. 7 is an explanatory drawing of a position of a unit cell that is a gas limitation object in a modification example.

In FIG. 7, the position of a unit cell in which relatively adverse conditions are easily assumed in the fuel cell 20 is shown by hatching. As shown in FIG. 7, in the unit cell positioned in the end portion, heat is easily dissipated. In such case, one unit cell or a plurality of unit cells located in the end portion can be specified as a detection object unit cell (group) for a system state, and the amount of produced water can be detected and the oxidizing gas flow rate can be estimated by measuring the temperature T, current A, and voltage V of this unit cell (group).

When unit cells (groups) at both ends are selected as the detection objects for the system state, the oxidizing gas flow rate is preferably estimated based on the detection values of the unit cell (group) that is worse (for example, has a lower temperature) from the standpoint of oxidizing gas flow rate control.

With such a processing, it is possible to prevent the occurrence of failure in a unit cell under adverse conditions for which the oxidizing gas flow rate estimated based on the average temperature or amount of produced water is inadequate.

In accordance with the present invention, produced water amount detection means is provided and the amount of water produced during low-efficiency operation of the fuel cell is accurately determined. Therefore, an appropriate warm-up operation can be performed within the shortest time possible, while inhibiting the occurrence of a state in which excess amount of water is produced and warm-up fails.

Further, the fuel cell system in accordance with the present invention can be applied not only to stationary fuel cells, but also to fuel cells installed as a power source for a movable body. In a movable body, warm-up is usually performed when the temperature during startup is relatively low, and where the power source is a fuel cell, a low-efficiency operation is conducted. The present invention can be applied during such low-efficiency operations. Examples of suitable movable bodies include ground movable means such as four-wheel vehicles and two-wheel vehicles, air movable means such as airplanes, helicopters, and spacecrafts, and on-water or underwater movable means such as ships and submarines.

I claim:

1. A fuel cell system in which an amount of gas to be supplied to a fuel cell is limited to perform a low-efficiency operation, comprising:
    a fuel cell;
    a fuel gas supply system for supplying a fuel gas to the fuel cell;
    an oxidizing gas supply system for supplying an oxidizing gas to the fuel cell; and
    a control unit programmed to perform the low-efficiency operation, the control unit further comprising:
        a produced water amount detection device that detects an amount of water produced in the fuel cell during the low-efficiency operation; and
        a gas supply limitation device that limits an amount of gas to be supplied to the fuel cell, based on the detected amount of water,
        wherein the produced water amount detection device is programmed to calculate the amount of water based on an integrated amount of an output current of the fuel cell from a start of the low-efficiency operation, and
        wherein the gas supply limitation device is programmed to calculate an estimated output current of the fuel cell at a predetermined time later based on an output voltage of the fuel cell, a temperature of the fuel cell, and the calculated amount of water, and is programmed to estimate the amount of gas to be supplied to the fuel cell based on the calculated, estimated output current of the fuel cell at the predetermined time later.

2. The fuel cell system according to claim 1, wherein the produced water amount detection device comprises:
   an output current detection device that detects the output current of the fuel cell;
   an output current integration device that integrates the detected output current for each detection timing; and
   a produced water amount computation device that estimates the amount of produced water, based on the integrated output current.

3. The fuel cell system according to claim 1, wherein the gas supply limitation device comprises:
   an output voltage detection device that detects the output voltage of the fuel cell;
   a temperature detection device that detects the temperature of the fuel cell;
   a next-cycle current estimation device that estimates the output current after a predetermined interval, based on the estimated amount of produced water, the detected output voltage, and the detected temperature;
   a gas flow rate estimation device that estimates a flow rate at which the gas has to be supplied to the fuel cell, based on the estimated output current after the predetermined interval; and
   a gas supply control device that supplies the gas at the estimated flow rate to the fuel cell.

4. The fuel cell system according to claim 1, wherein the amount of water is detected, based on a state of a portion with relatively adverse conditions within the fuel cell.

5. The fuel cell system according to claim 1, wherein the gas supply limitation device limits the supply of the oxidizing gas.

6. A movable body having mounted thereon the fuel cell system according to claim 1.

* * * * *